March 2, 1965  A. S. NICHOLAS  3,171,688
RECEIVER FOR SEAT BELT RETRACTOR
Filed Feb. 13, 1964  2 Sheets-Sheet 1
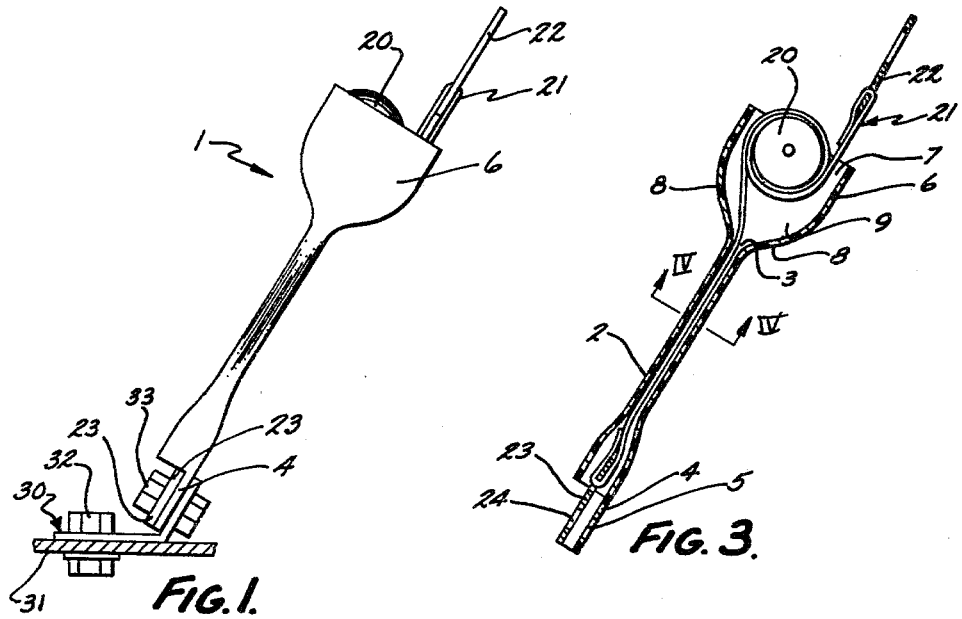
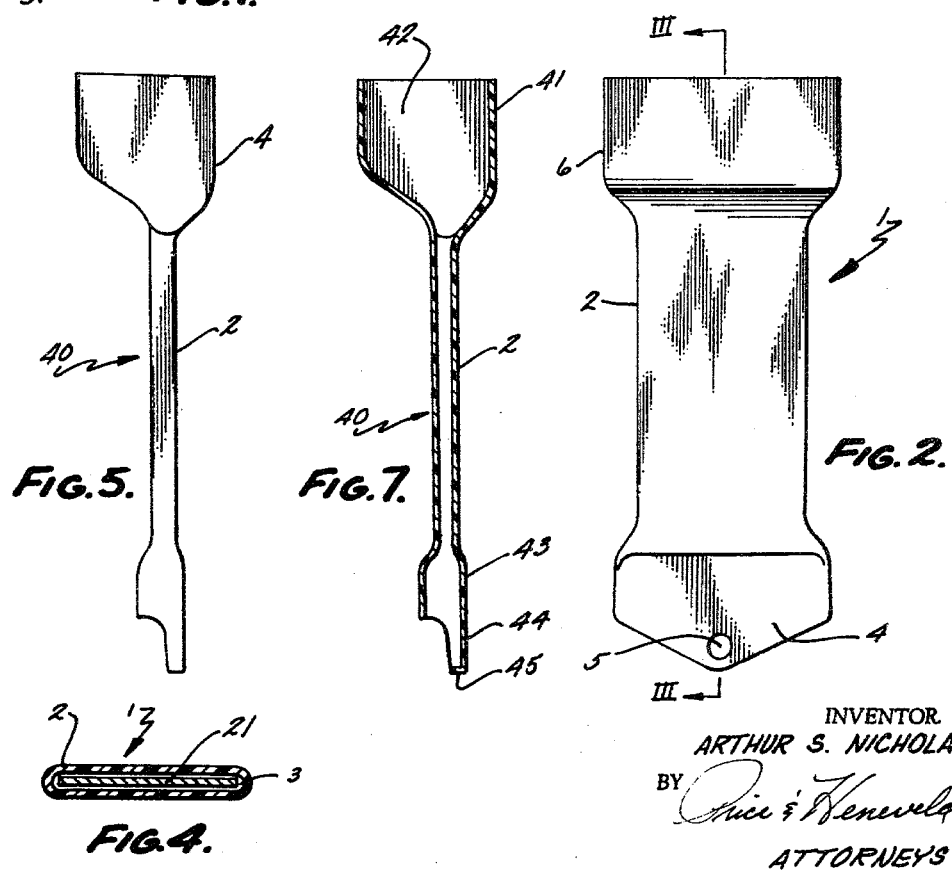
INVENTOR.
ARTHUR S. NICHOLAS
BY
ATTORNEYS March 2, 1965  A. S. NICHOLAS  3,171,688
RECEIVER FOR SEAT BELT RETRACTOR
Filed Feb. 13, 1964  2 Sheets-Sheet 2
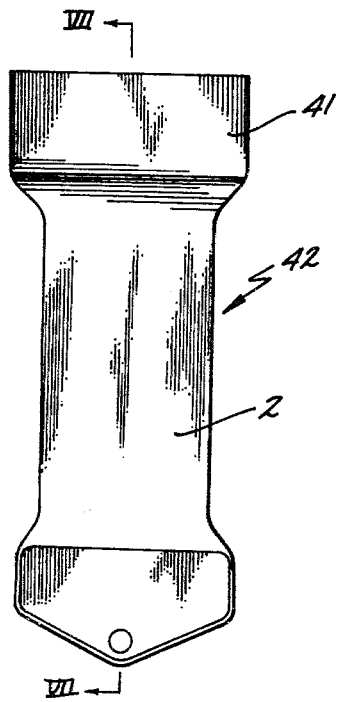
FIG. 6.
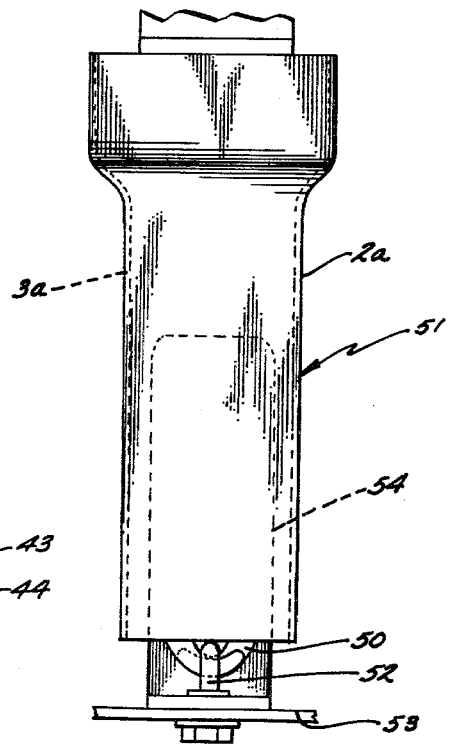
FIG. 8.
FIG. 9.
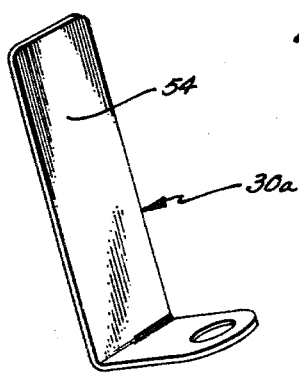
FIG. 10.
INVENTOR.
ARTHUR S. NICHOLAS
BY
ATTORNEYS United States Patent Office 3,171,688
Patented Mar. 2, 1965

3,171,688
RECEIVER FOR SEAT BELT RETRACTOR
Arthur S. Nicholas, Grand Rapids, Mich., assignor to Leon Chemical Industries, Inc., Grand Rapids, Mich., a corporation of Michigan
Filed Feb. 13, 1964, Ser. No. 344,727
4 Claims. (Cl. 297—388)

This application relates to accessories for seat belts, and more particularly to a housing for receiving and storing self-retracting seat belts.

This application is a continuation-in-part of co-pending application, Serial No. 306,117, filed September 3, 1963, now abandoned, entitled Receiver for Seat Belt Retractor.

With the advent of widespread usage of seat belts, the problem of what to do with the seat belt when it is not in use has become one of increasing concern to those involved in the design and application of this equipment. Unless some provision is made for retracting, at least those portions of the seat belt which normally are adjacent the doors, these portions tend to follow the passenger out of the car. When this happens, unless time and care is taken to fold the seat belt back on the seat, the belt becomes clamped between the door and frame when the latter is closed. This makes the belt dirty, and rapidly weakens the belt by excessive wear of the belting material.

This is not the only undesirable result of the belt following the passenger out of the car. The end of the belt is normally long enough to reach the ground where it frequently drops into water, dirt, snow and chemical laden slush. All of this makes the belt dirty and unfit to be strapped across a person's clothes. If this dirt becomes embedded in the fabric of the belt, it is all but impossible to remove. Many of the chemicals are corrosive and rapidly destroy the finish on the belt hardware. Examples of such chemicals frequently encountered are salt and calcium chloride.

This situation is bothersome to the users of seat belts. If the seat belts are carefully placed on the seat when the user leaves the car, he must remember to unfold them before re-entering the car. When he does this, if he accidentally releases the outer one and the door is open, it frequently drops out into the dirt. If the door is closed, it frequently slides in the narrow space between the door and the seat where it is unaccessible without first opening the door.

To overcome this difficulty, a number of devices have been evolved to automatically retract at least that portion of the seat belt which is adjacent the door. This solves the problem of what to do with the seat belt when it is unfastened, but the retractors themselves have created a new set of problems. It is the purpose of this invention to solve these problems.

This invention provides a means of supporting the retractors and the end of the seat belt in a handy and accessible position where it may be easily grasped by the passenger and extended for buckling. At the same time, it provides an enclosed or semi-enclosed storage pocket for the retractor mechanism. It stores the retractor and the belt in a position where it does not interfere with entering or leaving the car, yet immediately accessible when needed.

In doing this, it stores the mechanism and the belt within a protected casing where it is safe from damage, and largely protected from soiling. It also prevents the mechanism from becoming entangled with clothes, thereby preventing soiling or damaging of the clothes. It prevents the retractor mechanism and the belt from getting under foot, either of the passengers entering and leaving the front seat, or those entering or leaving the back seat. It provides a housing protecting the mechanism from scuffing or damage by back seat passengers due to their feet contacting the belt or the retractor.

In addition to serving as a storage facility for the retractor, it provides an automatic stop for those retractors which travel with the belt. This relieves the retractor mechanism of the necessity of providing some type of limit control. It stores the retractor in a position where the end of the belt will always be accessible.

These and other objects and purposes of this invention will be understood by those acquainted with the design and use of seat belts upon reading the following specification and the accompanying drawings.

In the drawings:

FIG. 1 is a side elevational view of this invention with the seat belt and retractor in place.

FIG. 2 is a front elevation view of the housing.

FIG. 3 is a sectional elevation view taken along the plane III—III of FIG. 2, showing the seat belt and retractor mounted within the housing.

FIG. 4 is a sectional elevation view taken along the plane IV—IV of FIG. 3.

FIG. 5 is a side elevation view of a modified form of the housing.

FIG. 6 is a front elevation view of the housing illustrated in FIG. 5.

FIG. 7 is a sectional elevation view taken along the plane VII—VII of FIG. 6.

FIG. 8 is a fragmentary view of the anchor end of the housing of FIG. 5 taken along the same plane as FIG. 7, but showing the anchor plate for the belt in position.

FIG. 9 shows a housing with a modified anchor structure.

FIG. 10 is an oblique view of the modified anchor bracket used in FIG. 9.

The execution of the objects and purposes of this invention involves a housing of a sufficiently rigid material to support the housing, the belt and the retractor mechanism in either a vertical or inclined position. The housing is open at one end to make the end of the belt accessible for attachment to the vehicle body. The other end of the housing is enlarged to provide a cup or pocket into which the retractor mechanism of the belt is received when the belt is fully retracted. The housing has a continuous opening from end to end to permit the belt to pass through it.

Referring specificially to the drawings, and particularly to FIG. 1, the numeral 1 refers to a housing having a tubular neck or body portion 2 of generally rectangular shape as is best seen in FIG. 4. The tubular body portion 2 has a greater axis extending sideways of the housing, and a lesser axis extending front and rear of the housing. This produces a central opening 3 having, in cross section, a long, narrow, rectangular shape.

The lower end of the housing is open with one of the wide sides of the body portion extending beyond the open end to form an anchor flap 4. The anchor flap has an aperture 5 to receive a fastener (FIG. 2).

The opposite end of the housing is flared outwardly to form an enlarged cup or pocket 6. The pocket has a large open end 7 which receives the retractor 20 and the belt 21. The opposite end of the pocket narrows down and communicates with the passage 3 in the body portion 2 of the housing. As the sides of the pocket converge, they form walls 8, which, as will be readily seen from FIG. 3, provide a seat and a stop for the retractor mechanism 20 of the belt 21.

The retractor mechanism 20 has some type of a biasing structure such as an internal spring which biases it to wrap up the belt and store it as a coil within the central opening 9 of the pocket 6. The adjacent free end of the belt has a latch plate 22 suitable for engaging a buckle mounted on the other half of the belt.

The opposite end of the belt has an anchor plate 23 equipped with an aperture 24 which seats over and aligns with the aperture 5 in the anchor flap 4. The body portion 2 is provided with a small sideways flare adjacent the open end to accommodate the additional width of the anchor plate 23. The belt and retractor mechanism are not described in further detail since the specific structure of the retractor and of the belt is not a part of this invention. Various types of retractor mechanisms and belts of various designs may be used with this invention. However, the housing operates in cooperation with the retractor and the belt and to this extent, they operate as a combination.

The pocket 6 is also flared laterally of the housing as is indicated in FIG. 2. This provides sufficient room for the retractor mechanism to be received within the pocket while the passageway or opening 3 within the body portion 2 of the housing may be restricted to a size such that it closely fits about the belt 21.

When installed, this invention is secured by an anchor bracket 30 to a suitable portion of the vehicle structure such as the plate 31 forming the vehicle floor. This is accomplished by means of a bolt 32 (FIG. 1). A bolt 33 passing through the apertures 24 and 25 secures the anchor plate 23 and the housing to the anchor bracket 30. It will be noted that the anchor flap 4 is clamped between the anchor plate 23 and the anchor bracket 30. This locks the housing 1 in place and prevents it from accidentally riding along the belt. Also, this gives it firm support, whereby the housing may support the weight of the belt and the retractor in a position where it will be readily accessible to the user, but so located that it will not interfere with entering or leaving the vehicle either by the front or the back door.

The housing is of a material of sufficient stiffness that it can support its own weight and that of the belt and the retractor. Thus, it may be of a metal or of a semi-rigid synthetic resin. Preferably, it is of the latter material since this, while stiff enough to hold the structure in place, has sufficient flexibility that should it be hit, it will not become permanently bent. Also, many of these plastic materials are highly resistant to scuffing, moisture and soil. As such, it will be more durable and retain a neat and desirable appearance over a greater life span.

FIGS. 5, 6 and 7 illustrate a modified form of this invention. The housing 40 is quite similar to the housing 1. The central body portion 2 is identical. The pocket portion 41, however, instead of being symmetrical about the greater and lesser axes of the central body portion 2, is offset largely to one side of the greater axis of the central body portion. This forms an offset pocket opening 42. While the function of the pocket 41 remains the same as the pocket 6, the fact that it is offset to one side makes it more convenient when installed in certain automotive body styles by eliminating interference with other portions of the body structure. Like the pocket 6, it is also flared sideways sufficiently to permit the retractor to seat within the pocket (FIG. 6). The other end of the housing 40, like the housing 1, is open and has a projecting anchor flap 43. The anchor flap 43 has an opening 44 for reception of a fastener in the same manner as the anchor flap 4 illustrated in FIG. 1. However, the free end of the anchor flap 43 has an inturned lip 45 which, as best illustrated in FIG. 8, seats around the end of the anchor plate 23 to assure a positive grip on the anchor plate. This prevents the housing from being pulled with the seat belt when the latter is extended. Like the housing 1, the body portion 2 is slightly flared sideways adjacent this opening to accommodate the anchor plate 23.

FIGS. 9 and 10 illustrate the application of this invention to a seat belt structure employing a scissors type or so-called "sister-hook" means of securement 50 to the vehicle body. In this case, no means are provided to prevent sliding travel of the housing along the belt. This, however, is not considered to create any serious problem. In the case of retractors of the type which travel with the belt, the belt unwinds from both sides of the retractor. The portion of the belt enclosed within the narrow body portion 2 of the housing does not travel lengthwise. Thus, it does not urge the housing to shift from its assigned position. In the case of reel-type retractors in which the retractor remains within the pocket at all times, the same situation is true.

It will be noted that body portion 2a of the housing 51 is straight at its lower end. Thus it slides down the belt until it rests upon the top of the eye bolt 52. In this position, it only partially covers the "sister-hooks" 50 and does not cover any of the means by which these hooks are attached to the vehicle body 53.

However, since no portion of the housing 51 is positively secured to the attachment means (the eye bolt 52), some structure must be provided to support the housing. This is accomplished by the special anchor bracket 30a. This anchor bracket 30a has a long, upstanding leg 54 which extends a substantial distance into the central opening 3a of the neck or narrow body portion 2a.

Since the point of attachment of the seat belt to the vehicle is fixed, while the seat itself is adjustable fore and aft of the vehicle, it is necessary that the seat belt attachment and, therefore, the housing be permitted a certain amount of pivotal movement to accommodate its angular position to the location of the seat.

In the case of the structures illustrated in FIGS. 1-8, this is accomplished by pivoting about the anchor bolt 33. In the case of the structure illustrated in FIGS. 9 and 10, this is accomplished by tilting of the housing 51 about the leg 54 of the anchor bracket 30a. For this purpose, the leg 54 is narrower than the central opening in the housing, permitting the housing a degree of pivotal movement even though the leg 54 remains fixed. This structural arrangement permits mono-planar movement only, this being in the plane of the broad side of the leg 54. The frictional engagement between the leg, housing and belt makes the structure resist this movement. Thus, adequate support is provided for the housing, belt and retractor.

It will be observed that this invention provides a housing for a retractable seat belt into which the seat belt and its retracting mechanism are received when the seat belt is not in use. As such, it encloses and protects the seat belt and retractor mechanism. It holds the seat belt and the retractor mechanism readily accessible permitting the end of the seat belt to be quickly grasped and extended. The pocket, while providing a seat for the retractor, also provides a positive stop for the retractor limiting its retraction movement.

It will be understood that while this invention has been described as primarily intended as a storage unit for those portions of the seat belts which are adjacent the door, it may be used in other locations. It may be used between the individual cushions of a divided or split seat as on one or both sides of each unit of bucket-type seats. With modifications that are within the basic concept of the invention, it may be adapted for use with the inner portions of seat belts used on cars equipped with a single cushion, full width seat.

While a preferred embodiment and two modifications of this invention have been illustrated and described, it will be understood that other modifications of this invention may be made. Such of these modifications as incorporate the principles of this invention are to be considered as included in the hereinafter appended claims, unless these claims by their language expressly state otherwise.

I claim:

1. A housing for self-retracting seat belts having a retractor mechanism comprising: a body having a tubular portion open at both ends and an enlarged pocket portion at one end communicating therewith; said tubular portion having an opening therethrough to receive the seat belt; said pocket portion opposite from said tubular portion being open to receive said retractor therein and being shaped to seat and hold said retractor; said body being formed of a resilient synthetic resinous material having sufficient rigidity to support itself the seat belt and the retractor in a free-standing inclined position, and characterized by sufficient flexibility for self-adjustment.

2. A housing as described in claim 1 wherein anchor means is provided at the end of said housing remote from said pocket portion, said anchor means being a bracket having one leg extending into and partially through said opening of said tubular portion; said leg being narrower than said opening, permitting said housing limited monoplanar pivotal travel with respect to said leg while said leg supports said housing.

3. In combination, a seat belt having a retractor and a housing for receiving said retractor; said housing having a tubular portion opening at both ends and an enlarged pocket portion at one end communicating therewith; said tubular portion having an opening therethrough to receive said seat belt; said pocket portion opposite from said tubular portion being open to receive said retractor therein and shaped to seat and hold said retractor; said body being formed of a resilient synthetic resinous material having sufficient rigidity to support itself the seat belt and the retractor in a free-standing inclined position and characterized by sufficient flexibility for self-adjustment; said retractor when retracted being nested in said pocket portion and entirely supported thereby.

4. The combination recited in claim 3 wherein anchor means is provided on said housing at the end thereof remote from said pocket portion, said anchor means being formed by a flap integral with and extending from the end of said housing remote from said pocket; an anchor plate on the end of said seat belt overlying said anchor flap; an anchor bracket for securing the anchor plate to a vehicle body; a fastener for securing said anchor plate to said anchor bracket, said fastener passing through said anchor plate, said anchor flap and said anchor bracket with said anchor flap being clamped between said anchor plate and said anchor bracket for supporting said housing when said seat belt is secured in place.

References Cited by the Examiner
UNITED STATES PATENTS

| | | | |
|---|---|---|---|
| 2,488,858 | 11/49 | Franz | 297—388 |
| 2,830,655 | 4/58 | Lalande | 297—388 |
| 2,945,275 | 7/60 | Almeter | 297—385 |
| 2,964,100 | 12/60 | McCall | 297—388 |
| 3,046,056 | 7/62 | Greene | 297—385 |
| 3,126,228 | 3/64 | Greene | 297—385 |

FRANK B. SHERRY, *Primary Examiner.*